Patented June 22, 1954

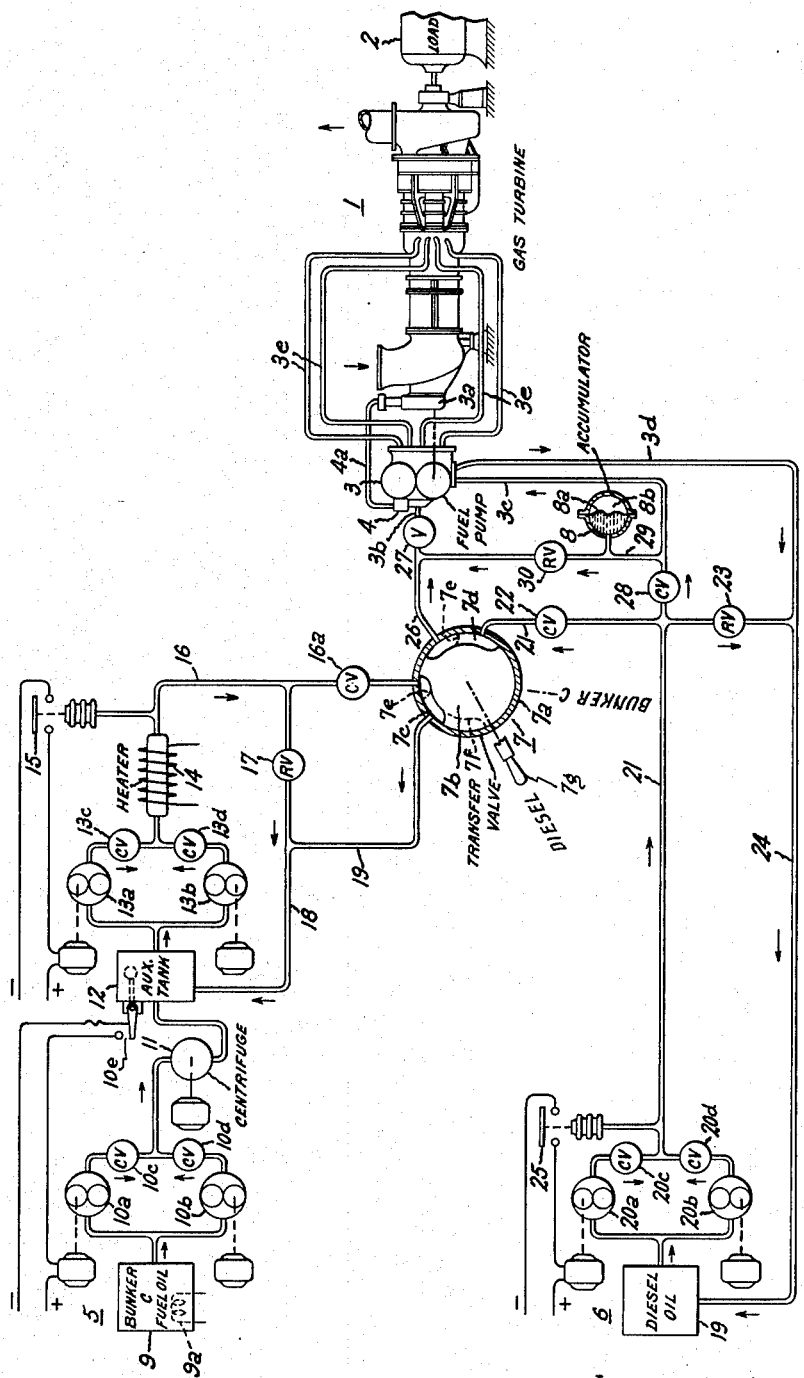

2,681,694

UNITED STATES PATENT OFFICE 2,681,694

DUAL LIQUID FUEL SYSTEM

Arne Loft, Schenectady, N. Y., assignor to General Electric Company, a corporation of New York Application November 24, 1951, Serial No. 258,058

6 Claims. (Cl. 158—36.3)

This invention relates to liquid fuel systems for thermal powerplants, particularly to a dual liquid fuel supply system for a gas turbine powerplant.

In order to achieve sufficiently high efficiency to make the gas turbine powerplant commercially feasible, it has been found necessary to make the normal operating temperature just as close as practicable to the maximum temperature which the materials available will withstand. In such a powerplant designed for normal operating temperature levels on the order of 1500° F., it is essential that excessive temperatures be avoided, since a temperature rise of even 50°, if it persists for any length of time, may result in a substantial reduction in the life of the components. Likewise, "thermal shock," due to sudden changes in temperature, must be avoided. It has been found that a sudden variation in the fuel supply pressure, as might occur for instance where the electric power driving the fuel pump experienced a transient failure, will produce such serious temperature shocks as to adversely affect the operation and service life of the powerplant.

Accordingly, an object of the invention is to provide an improved liquid fuel supply system for a gas turbine powerplane with special means for preventing transient decreases in fuel supply pressure, and consequent increase in fuel flow upon sudden return of supply pressure.

A particular object is to provide means for maintaining constant fuel pressure in a dual fuel system, such as those for supplying a heavy "residual" fuel oil to the powerplant in normal operation, with an auxiliary system for supplying a lighter fuel oil, such as diesel fuel, during the starting cycle and in the event of emergency breakdown of the heavy fuel supply system.

A still further object is to provide an improved dual fuel system which, in the event of failure of both sources of fuel, will permit continued operation of the plant for a short interval until one of the fuel sources again becomes operative.

Other objects and advantages will become apparent from the following description taken in connection with the accompanying drawing, in which the single figure is a diagrammatic representation of a gas turbine with a dual fuel system incorporating the invention.

Generally, the invention is practiced by providing separate systems for supplying viscous fuel oil, such as that known commercially as "Bunker C," and diesel fuel, with a multiple-position transfer valve and special accumulator means which is charged from the lighter oil system and which automatically discharges to the powerplant in the event of any transient drop in the heavy fuel oil supply pressure.

Referring now more particularly to the drawing, this dual fuel system is shown applied to a gas turbine powerplant indicated generally at 1 as connected to a suitable load device, such as the electric generator 2. The gas turbine is of course provided with a number of auxiliary devices, such as various servo mechanisms for preventing excessive temperature and speed conditions, etc., and a fuel pump shown generally at 3 as being driven from the gas turbine rotor. This fuel pump may be of any suitable type, but is preferably of the general type disclosed in the copending application of Bruce O. Buckland, Serial No. 183,332, filed September 6, 1950 and assigned to the same assignee as the present application. This is a multiple piston variable displacement pump with special servo-mechanism for altering the displacement of the pump in accordance with the dictates of a complex regulating mechanism having speed, temperature, and pressure responsive components. Such a gas turbine fuel regulator is disclosed, for instance, in United States Patent 2,558,592, issued June 26, 1951 on an application to N. E. Starkey, Carl B. Lewis and M. A. Edwards, and assigned to the same assignee as the present application. Such a regulator is indicated diagrammatically at 4 in the drawing as being arranged to supply a hydraulic pressure signal by way of conduit 4a to a servo mechanism 3a which is arranged to vary the rate of fuel delivery by pump 3.

Successful operation of the fuel pump 3 requires that suitable liquid fuel at an appropriate, and substantially constant, pressure be supplied to the pump inlet 3b. This pump also requires that a comparatively light oil be supplied at all times for lubricating purposes. This lubricating oil is supplied through conduit 3c and returned to the light oil system by drain conduit 3d.

The dual fuel system, to which the present invention particularly relates, comprises a primary system for supplying heavy oil, indicated generally at 5, an auxiliary system for supplying a lighter oil, indicated generally at 6, a transfer valve 7 for interconnecting the two systems, and an accumulator 8 for preventing excessive fuel pressure variations.

The primary fuel system 5 comprises a main fuel oil storage tank 9, two first-stage fuel supply pumps, arranged in parallel and identified 10a and 10b, at least one fuel cleaning centrifuge 11, a second fuel tank 12, two second-stage fuel pumps, also arranged in parallel and identified 13a, 13b, and a suitable fuel heater 14.

The main fuel tank 9 is provided with heating means, such as an electric or steam heating coil indicated diagrammatically at 9a. It will be appreciated by those skilled in the art that the heavy "Bunker C" fuel oil is so viscous as to be almost impossible to pump, particularly when the oil temperature is below 100° F. The first-stage pumps 10a, 10b are connected in parallel to supply fuel oil past check-valves 10c, 10d to the centrifuge 11 where solid impurities are removed, the purified oil being delivered to the second fuel tank 12. The first-stage pumps 10a, 10b are driven by suitable motors, such as the electric motors shown. Pump 10b runs at all times when the powerplant is operating, while the second pump 10a comes into operation only when the oil level in the auxiliary tank 12 drops below a preselected value. To this end, pump 10a is arranged to be energized by a level-sensitive switch 10e which closes when the oil drops to a preselected minimum. This auxiliary motor 10a obviously could be stopped and started in other ways, and could even be controlled manually when the supply of fuel by pump 10b to the tank 12 becomes inadequate.

From tank 12, the warmed and purified oil is taken by the second-stage pump 13b and passed through check valve 13d to a suitable electric or steam heater 14 arranged to keep the oil at a temperature on the order of 220° F. The other second-stage pump 13a discharges through check valve 13c and is provided with a pressure-sensitive switch 15 which starts pump 13a when the pressure furnished by pump 13b drops too low. From heater 14, fuel oil passes through conduit 16 to the transfer valve 7, which has a check valve 16a adjacent the inlet thereof. Fuel pressure at the inlet to transfer valve 7 is held substantially constant, at a value on the order of 30 lb. per sq. in., by a pressure-regulating relief valve 17 which returns any excess fuel to tank 12 through conduit 18. Communicating between the transfer valve 7 and the return conduit 18 is a bypass conduit 19, the function of which will be seen hereinafter.

The auxiliary fuel system 6 comprises a main diesel oil tank 19, two first-stage pumps 20a, 20b, arranged in parallel and discharging through check valves 20c, 20d to the diesel fuel supply conduit 21. Conduit 21 communicates with the transfer valve 7, with a check valve 22 at the inlet thereof. The diesel fuel supply pressure is maintained constant by another pressure-regulating relief valve 23, from which excess oil is returned to tank 19 by a conduit 24.

It is to be noted that the diesel fuel supply pressure held by valve 23 is somewhat higher than the Bunker-C fuel pressure maintained by relief valve 17, the diesel oil pressure being perhaps in the neighborhood of 35 lb. per sq. in., while the Bunker-C pressure is about 5 lb. per sq. in. lower. This is to insure that there will at no time be any leakage of the heavy oil into the diesel oil circuit; any leakage there may be will occur in the opposite direction. There is, of course, no harm done if a small quantity of the diesel oil contaminates the Bunker-C, whereas the extremely viscous Bunker-C would cause malfunctioning if it got into the light oil circuit.

The diesel oil pump 20b is arranged to be driven at all times, as by an electric motor, while the pump 20a is provided with a pressure-responsive switch 25 which starts the pump 20a only when the supply pressure of pump 20b drops below a preselected value.

The transfer valve 7 is arranged to deliver fuel to the discharge conduit 26, which contains a fuel shutoff valve 27 adjacent the inlet 3b of the gas turbine fuel metering pump 3, which as indicated above is driven by suitable gearing (not shown) from the gas turbine rotor shaft. As also indicated above, the fuel pump 3 may be of the type disclosed in patent application Serial No. 183,332, mentioned above, and may be arranged to supply fuel by a plurality of separate conduits 3e to the respective combustion chambers or combustors of the gas turbine 1.

Light oil for lubricating the fuel pump 3 is supplied from conduit 21 past a check valve 28 to the pump lubricating supply conduit 3c. Spent lubricant is returned by conduit 3d to the return conduit 24.

The arrangement of the transfer valve 7 is as follows. While the exact mechanical details may take many forms, the diagrammatic representation of the transfer valve in the drawing will indicate the functions to be performed. As shown, the valve housing 7a contains a rotatable flow control cylinder 7b. The circumference of cylinder 7b is provided with two cutout portions 7c, 7d, and the cylinder is arranged to have two positions identified "Diesel" and "Bunker-C." In the "Diesel" position, shown in the drawing, cutout 7c puts the Bunker-C supply conduit 16 in communication with the bypass conduit 19, and cutout 7d communicates with the fuel pump supply conduit 26 and the diesel oil supply conduit 21. When the flow control cylinder 7b rotates to the second position identified "Bunker-C," the cutout 7d communicates with conduits 16 and 26, as shown by the dotted lines 7e, while the other cutout 7c moves to the dotted line position 7f.

It will be appreciated by those skilled in the art that positioning of the valve control cylinder 7b may be effected either by the manual handle 7g, as assumed by the description of the operation herein, or by any suitable automatic regulating system arranged to produce the sequence of steps necessary in starting the plant and switching from one fuel to the other.

The fuel accumulator 8 may be of any suitable type, for instance that having a housing containing a bladder or diaphragm 8a with air or other suitable gas under pressure in the space 8b at one side of the diaphragm. As shown in the drawing, accumulator 8 communicates with an emergency supply conduit 29, which receives light oil from conduit 3c at the downstream side of check valve 28, and discharges through a relief valve 30 into the fuel pump supply conduit 26.

It is to be noted that the accumulator relief valve 30 is provided with a pressure-regulating spring arrangement (not shown) so that a preselected pressure differential between diesel supply conduit 21 and pump supply conduit 26 must occur before the relief valve 30 will open. This pressure differential may be on the order of 10 lb. per sq. in. As indicated above, the diesel supply pressure in conduit 21 is maintained at a value on the order of 35 lb. per sq. in. by pressure regulating valve 23, while the Bunker-C supply pressure in conduit 16 is maintained at a pressure on the order of 30 lb. per sq. in. by regulating valve 17. Thus, in normal operation, the pressure differential between the diesel circuit and the Bunker-C circuit is insufficient to open the check valve 30. As will be seen from a consideration of the arrangement of the check valves 28, 30 and the flow indicating arrows in the drawing, the accumulator 8 will normally be charged at a pressure of 35 lb. per sq. in. from the diesel supply conduit 21 and will discharge past valve 30 into the fuel pump supply conduit 26 when the pressure therein falls below a preselected value on the order of 25 lb. per sq. in.

In the event the diesel oil supply pressure in conduit 21 should fall below the pressure to which the accumulator 8 is charged, the accumulator will cause check valve 28 to close and supply diesel oil to the fuel pump lubricating circuit 3c, 3d.

The method of operation of this dual fuel system is as follows. Assume first that the plant is shut down with both fuel systems 5, 6 cold and inoperative. In preparing to start the plant, the Bunker-C fuel oil in the main tank 9 must first be heated by coil 9a. When this heavy oil becomes sufficiently fluid to be pumped, the first-stage pump 10b may be started and the centrifuge 11 operated to supply warmed and purified fuel to the auxiliary tank 12. If, during the further operation of the system, the supply of fuel by pump 10b becomes insufficient, the auxiliary pump 10a will automatically become operative to bring the supply back to the required rate. It may also be found necessary to steam jacket the pipes 16, 18, etc. so the entire Bunker-C circuit can be preheated. With tank 12 filled, second-stage pump 13a may be started to supply oil through the heater 14, through conduit 16, and past check valve 16a to transfer valve 7. Since the transfer valve is in the "Diesel" position, hot Bunker-C oil will be circulated through the cut-out 7c to the bypass conduit 19 and back through conduit 18 to tank 12. The relief valve 17 will hold the Bunker-C supply pressure in conduit 16 at the desired value of 30 lb. per sq. in., and the discharge pressure of pump 13b will be sufficient to cause some flow through valve 17, so that the entire Bunker-C circuit becomes filled with heated moving oil. This circulation of warm heavy oil is continued until all parts of the primary fuel circuit up to the transfer valve 7 are brought to normal operating temperature, which may be on the order of 200 to 210° F.

Meanwhile, diesel oil from tank 19, which needs no preheating, is supplied by pump 20b to the diesel supply conduit 21. The pressure regulating valve 23 will bypass some oil to return conduit 24 so as to maintain the pressure in conduit 21 at the desired value of 35 lb. per sq. in. Since the fuel stop valve 27 is closed, there will be no diesel oil flow through the transfer valve. However, diesel oil will be supplied past check valve 28 to charge the accumulator 8 and circulate lubricating oil to the fuel pump 3 through conduits 3c, 3d.

If now the fuel shutoff valve 27 is opened, diesel fuel will be supplied to pump 3 and the powerplant 1 is ready to be started. This may be effected by a suitable starter motor (not shown) which brings the rotor up to "firing speed," so that the fuel pump 3 is caused to supply fuel to the combustors, after which the ignition system (not shown) is energized and combustion begins. The plant may continue to operate thus on diesel fuel until thoroughly warmed up and ready to assume load.

When it is desired to transfer to Bunker-C fuel, the transfer valve handle 7g is moved to the position identified "Bunker-C," in which the cutout 7d communicates between Bunker-C supply conduit 16 and fuel pump conduit 26. The supply of diesel fuel into the transfer valve is now blocked, and the powerplant operates on heavy oil from the Bunker-C system.

With this arrangement, it will be noted that hot oil is kept circulating in all parts of the Bunker-C circuit during the starting cycle, while the plant is operating on diesel oil. Thus, the viscous Bunker-C oil has no chance to congeal in any part of the system.

The function of the accumulator 8 in preventing excessive "dips" in fuel pressure and in supplying oil for emergency operation will be seen from the following.

Assume first that, during the starting cycle when operating on diesel oil, there is some emergency such as a failure of the electric motor driving pump 20b. The first thing to happen will be that pressure switch 25 starts the pump 20a. If during the changeover from pump 20b to pump 20a there should be a transient decrease in the diesel fuel supply pressure below the required value of 35 lb. per sq. in., check valve 28 will close and accumulator 8 will supply diesel fuel both through conduit 3c to lubricate fuel pump 3 and past relief valve 30 to the fuel pump supply conduit 26. When the diesel supply pressure rises to the normal value, the check valve 28 will again open and charge the accumulator 8. Note also that supply of fuel to conduit 26 from the accumulator 8 will cause check valve 22 to close, by reason of back-flow through the transfer valve 7. Thus, the accumulator 8 serves to maintain both the fuel supply and lubricating circuits at the desired pressures.

Likewise, when the plant is operating on Bunker-C oil, a drop of more than 5 lb. per sq. in. in the supply conduit 26 will cause the 35 lb. per sq. in. pressure stored in accumulator 8 to open check valve 30 (by reason of the 10 lb. per sq. in. pressure differential required to open this valve) and supply diesel oil to the conduit 26. Any tendency of this emergency diesel oil to flow backward through the transfer valve 7 will cause check valve 16a to close. Thus, the accumulator 8 serves also to smooth out any transient pressure drops in the Bunker-C fuel system, as may for instance be caused by temporary failure of the power supply for the electrically driven pumps 13a, 13b. In the event of complete failure of the Bunker-C system, the transfer valve 7 is slowly returned, manually or automatically, to the "Diesel" position, so that light oil is again supplied past check valve 22 and to conduit 26 at a pressure of 35 lb. per sq. in. While moving valve 7 to the "Diesel" position, direct flow through valve 28 and conduit 29 to conduit 26 supplies fuel to pump 3. The pressure differential across valve 30 now disappears, with the result that valve 30 closes and the diesel supply conduit 21 again charges accumulator 8.

In the event failure of the electric power supply should cause both Bunker-C pumps 13a, 13b and the diesel pumps 20a, 20b to stop, the accumulator 8 is of sufficient capacity to supply fuel past valve 30 to the pump 3 and also lubricating oil through conduit 3c for the brief period, perhaps on the order of 1 minute, until the power returns. If the power supply is not resumed within this time, the plant is shut down.

Thus, it will be apparent that the invention provides a dual fuel system for furnishing a light lubricating and fuel oil during the starting cycle and in case of emergency failure of the main heavy oil fuel system, with special accumulator means for smoothing out transient pressure dips in either the Bunker-C or diesel supply systems and for furnishing emergency lubricating oil and fuel in the event of complete failure of both systems. Thus, the system is protected against momentary failure of the electric power driving the fuel pumps, so that such transient conditions will not cause the automatic safety devices incorporated in the powerplant regulator 4 to shut down the plant. This is particularly important where the gas turbine powerplant drives a generator for supplying electrical energy to a distribution network with the electrically driven fuel pumps receiving their energy from the same network. In the event of a major fault in the distribution system, the resulting temporary failure of the fuel supply pumps would, without the invention, cause the combustion to cease and the automatic safety devices in the gas turbine powerplant to shut it down just at the time when its output was most needed in the electrical distribution system. In this connection, it will be appreciated by those familiar with gas turbine control systems that the regulator indicated generally at 4 will include automatic devices responsive to low lubricating oil pressure, low fuel pressure, and perhaps a safety device responsive to excessive changes in turbine temperature, all arranged to shut down the plant if the respective operating conditions get outside a preselected safe range. By keeping constant the supply of fuel and lubricant to the pump 3, regardless of brief dips in the fuel supply pressure maintained in conduits 16 and 21, the accumulator 8 prevents shutdown of the plant by these safety devices.

It will be appreciated that the accompanying drawing represents diagrammatically, and in somewhat simplified form, what in an actual machine would be an enormously complicated system. For instance, the automatic scheduling means for positioning transfer valve 7 may take many forms, the precise details of which are not material to an understanding of the present invention. It may be noted, however, that this positioning mechanism may include automatic devices for returning the transfer valve to the "Diesel" position in the event the Bunker-C fuel supply pressure drops below a preselected value.

While only one arrangement has been disclosed specifically herein, it will be apparent to those skilled in the art that the components shown diagrammatically in the drawing may assume many equivalent forms; and it is desired to cover by the appended claims all such changes and modifications as fall within the true spirit and scope of the invention.

What I claim as new and desire to secure by Letters Patent of the United States is:

1. In a dual liquid supply system for a thermal powerplant requiring both fuel and lubricating oil at preselected pressures, the combination of a primary system adapted to supply a first liquid at a preselected pressure, an auxiliary system adapted to supply a second liquid at a preselected pressure, a multiple-position transfer valve connected to receive primary liquid from the first system and auxiliary liquid from the second system and adapted to supply either liquid to the powerplant, a fuel conduit connected to supply liquid from the transfer valve to the powerplant, a lubricant conduit for supplying liquid from the auxiliary system to the powerplant, an emergency supply conduit communicating between said fuel supply conduit and lubricant supply conduit and containing a relief valve constructed to open at a preselected differential of the pressure in the fuel conduit below that in the lubricant conduit, and a liquid accumulator connected to said emergency conduit at the side of the relief valve adjacent the auxiliary liquid system and adapted to be charged with liquid therefrom and to discharge into the fuel and lubricant supply conduits when the pressure in either or both the primary and auxiliary liquid supply systems falls below preselected values.

2. A dual liquid supply system in accordance with claim 1 in which the primary fuel system includes a reservoir, pump means for supplying liquid therefrom under pressure, a first supply conduit including heater means for conveying liquid from the pump to the transfer valve, a second conduit containing a pressure-regulating relief valve for maintaining the pressure at the entrance to the transfer valve at a preselected value and connected to return liquid discharged by the relief valve to said reservoir, and a third conduit connected to the transfer valve and adapted to return liquid therefrom to the reservoir, whereby, when the primary system is cold, liquid may be recirculated from the reservoir through the heater to the transfer valve and back to the reservoir in order that all parts of the primary circuit may be brought to operating temperature before the transfer valve is positioned to supply primary liquid to the powerplant.

3. A dual liquid supply system comprising a primary system adapted to supply a first liquid at a preselected pressure for a first purpose, an auxiliary system adapted to supply a second liquid at a preselected pressure for a second purpose, a multiple-position transfer valve connected to receive primary liquid from the first system and auxiliary liquid from the second system and adapted to supply either to the consumer alternatively, a first discharge conduit connected to the transfer valve and to the consumer to supply either the first or the second liquid for said first purpose, a second conduit connected to supply liquid from the auxiliary system only to the consumer at all times for said second purpose, an emergency supply conduit communicating between said first and second conduits, one-way valve means in said emergency conduit preventing flow from the first conduit to the second conduit, and a liquid accumulator connected to the emergency conduit between said last-mentioned valve means and the second conduit and adapted to be charged with liquid from the auxiliary liquid system and to discharge auxiliary liquid into both said first and second conduits in the event the pressure in either or both the primary and auxiliary liquid systems falls below preselected values.

4. A dual liquid supply system in accordance with claim 3 in which the primary system supplies the first liquid to the transfer valve at a pressure lower than that at which the auxiliary liquid is supplied to the transfer valve by a preselected pressure differential, and the valve means in the emergency supply conduit is a relief valve constructed and arranged to open only in the event the liquid pressure in the first conduit drops below the pressure of the auxiliary liquid by an amount greater than said preselected differential, whereby in the event of any decrease in pressure of the auxiliary liquid below its normal value the accumulator immediately supplies liquid to the second conduit, while only in the event of a still greater drop in pressure in the discharge conduit will the accumulator discharge auxiliary liquid thereto.

5. In a dual liquid system, the combination of a primary system adapted to supply a first liquid at a preselected pressure for a first purpose, an auxiliary system adapted to supply a second liquid at a preselected pressure for a second purpose, a multiple-position transfer valve connected to receive primary liquid from the first system and auxiliary liquid from the second system and adapted to supply either to the consumer alternatively, a first discharge conduit connected to the transfer valve and to the consumer to supply either the first or the second liquid for said first purpose, a second conduit connected to supply liquid from the auxiliary system only to the consumer at all times for said second purpose, an emergency supply conduit communicating between said first and second conduits and including a pressure relief valve, a liquid accumulator connected to the emergency conduit at the side of said relief valve adjacent the auxiliary supply circuit to be charged with liquid therefrom, said primary liquid system including a reservoir, pump means for supplying liquid under pressure from the reservoir to the transfer valve, a first liquid supply conduit for conveying liquid from the pump to the transfer valve, regulating means for maintaining the first liquid pressure at the entrance to the transfer valve at a preselected value, a by-pass conduit connected to the transfer valve and adapted to return first liquid therefrom to the reservoir, said transfer valve means having at least two operating conditions, one condition effecting communication between the first liquid supply conduit and the bypass conduit for returning the first liquid to the reservoir while auxiliary liquids supplied through the transfer valve to the discharge conduit, and a second condition in which the flow of auxiliary liquid through the transfer valve is blocked and primary liquid is supplied through the transfer valve to the discharge conduit.

6. In a dual liquid system for supplying either of two liquids to a consumer for one purpose and only one of the liquids to the consumer for a second purpose, the combination of a primary system adapted to supply the first liquid at a first preselected pressure, an auxiliary system adapted to supply the second liquid at a second preselected pressure which is higher than said first pressure by a preselected differential, multi-condition transfer valve means connected to receive primary liquid from the first system and auxiliary liquid from the second system and adapted to supply either to the consumer alternatively, a first discharge conduit connected to the transfer valve means to supply either the first or the second liquid to the consumer for said first purpose, a second conduit connected to supply liquid from the auxiliary system only to the consumer at all times for said second purpose, an emergency supply conduit communicating between the first and second conduits and including a pressure relief valve adapted to open only upon the occurrence of a second pressure differential between the first and second conduits greater than said first preselected differential, a liquid accumulator connected to the emergency conduit at the side of the relief valve adjacent the auxiliary supply circuit so as to be charged with liquid therefrom, and check valve means between the emergency conduit and the auxiliary supply system, whereby upon any decrease in the auxiliary liquid supply pressure below the second preselected value, the accumulator will discharge immediately to supply auxiliary liquid to the consumer for said second purpose, whereas only upon a decrease in the first liquid pressure greater than said first differential will the accumulator discharge through the pressure relief valve to supply liquid to the consumer for said first purpose.

References Cited in the file of this patent

UNITED STATES PATENTS

| Number | Name | Date |
|---|---|---|
| 1,303,290 | Gibbs | May 13, 1919 |
| 2,066,452 | Bernard | Jan. 5, 1937 |
| 2,440,447 | McCollum | Apr. 27, 1948 |